Dec. 9, 1952        B. COOPER        2,621,101
TOLL COLLECTION TRANSACTION PRINTER
Filed Feb. 28, 1950        9 Sheets-Sheet 2

INVENTOR.
BENJAMIN COOPER
BY
J. B. Felshin
ATTORNEY

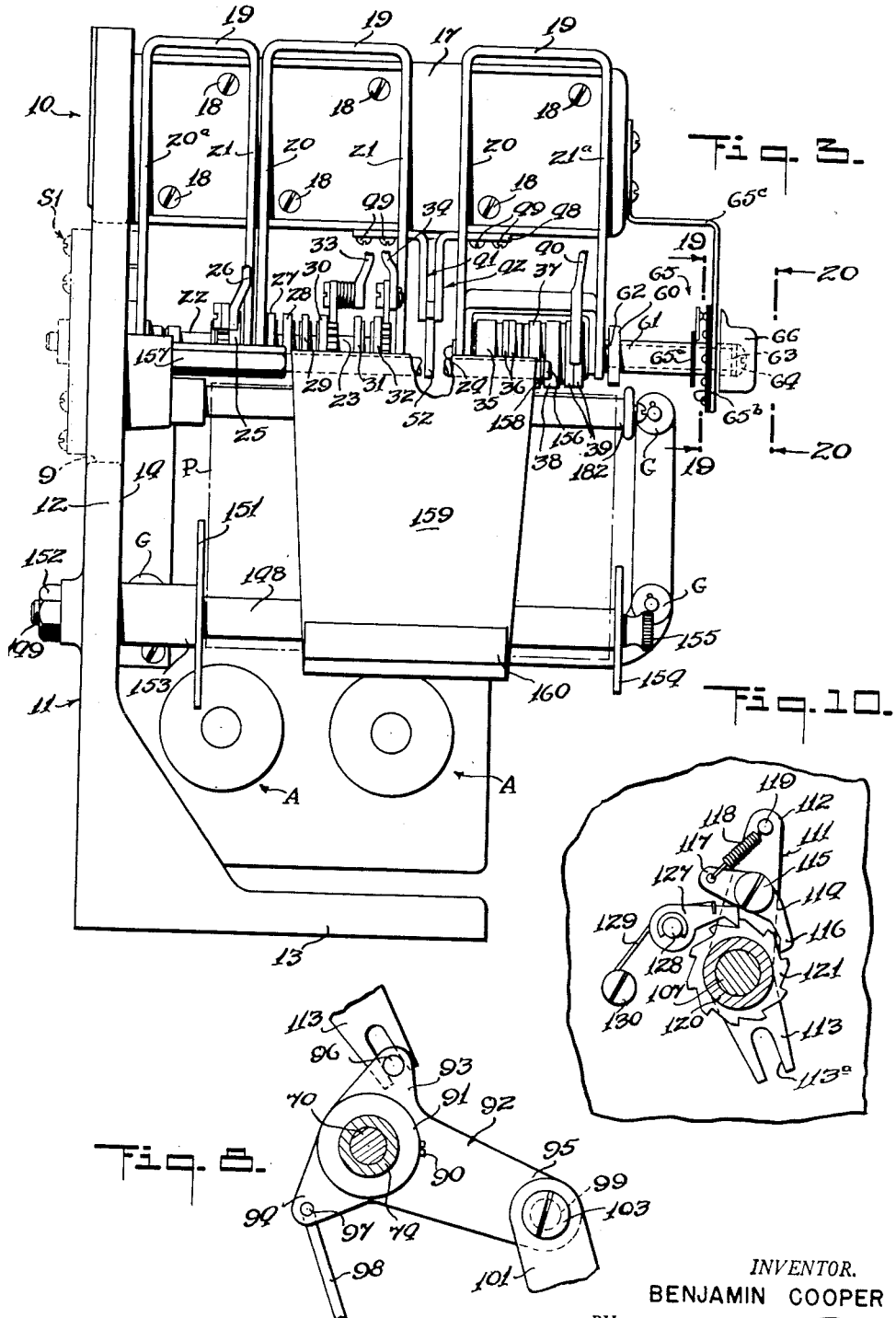

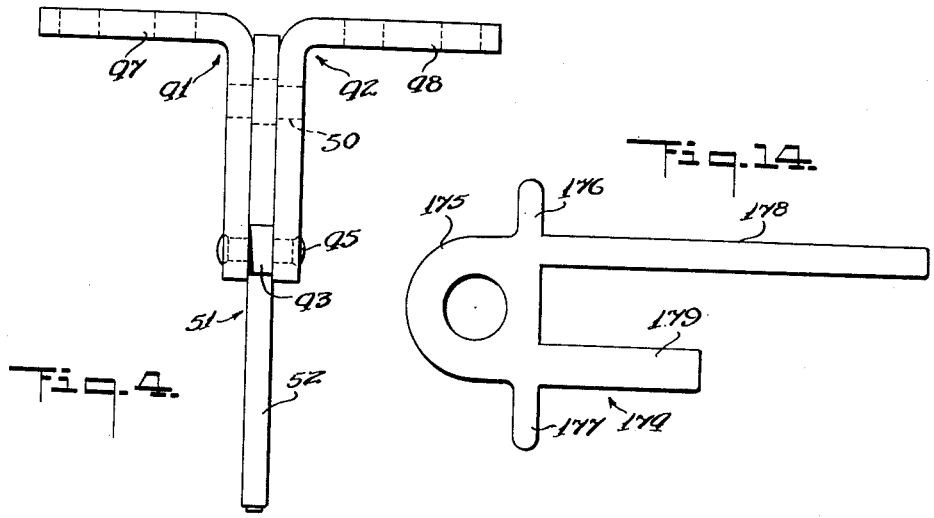
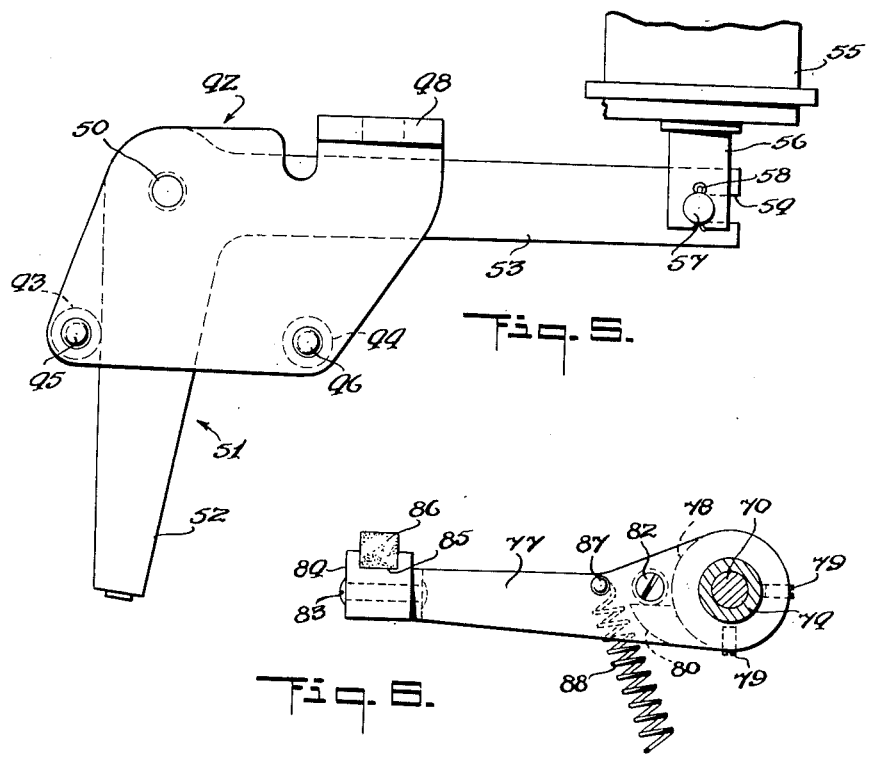

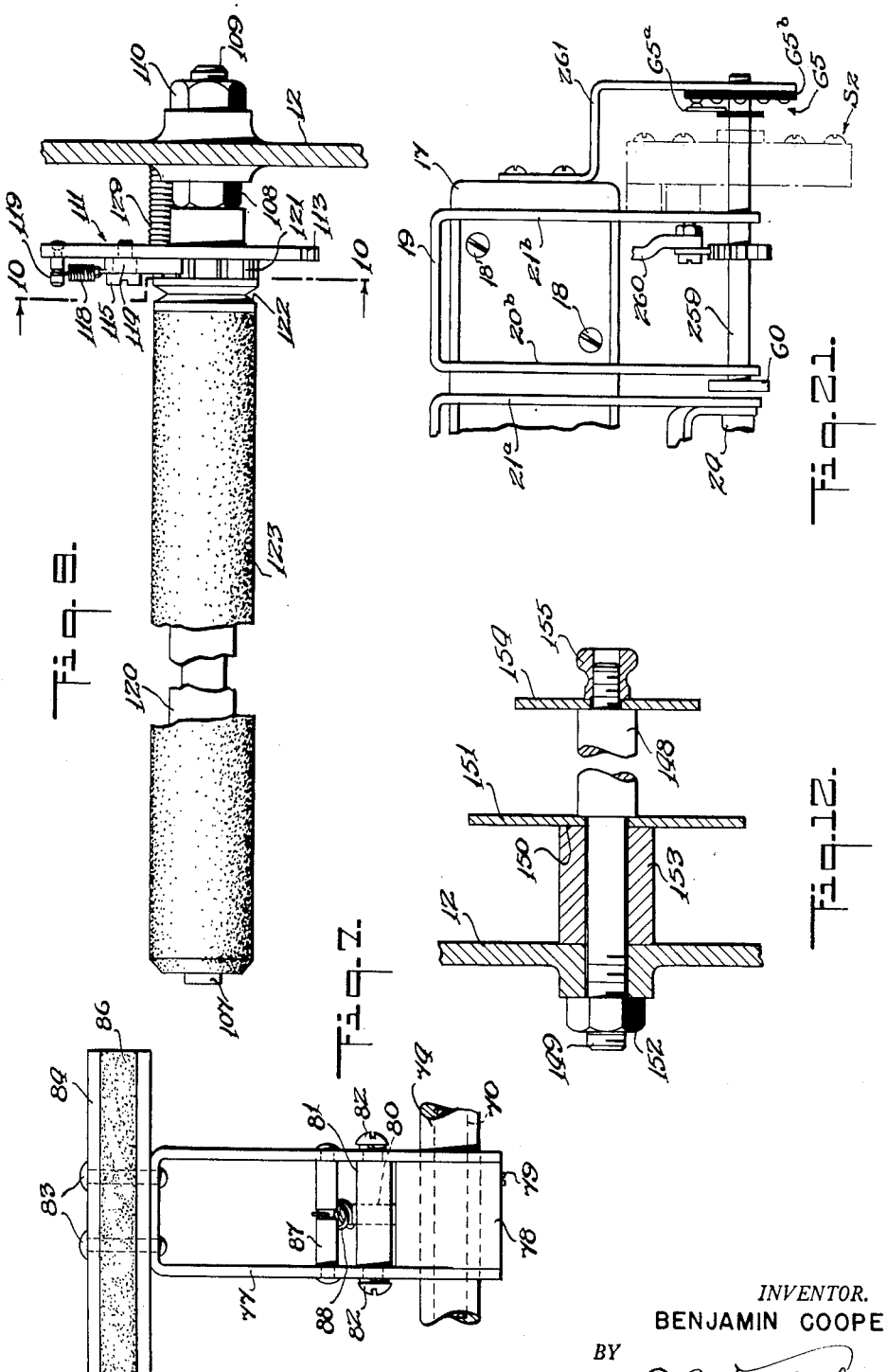

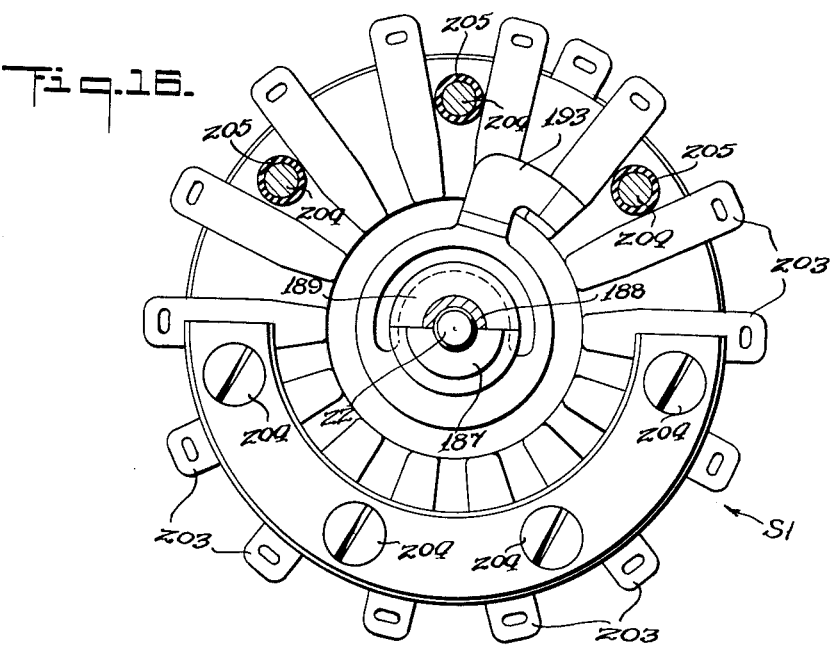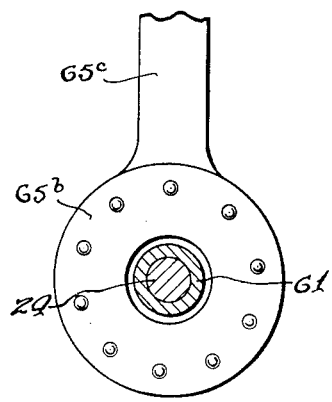

Dec. 9, 1952  B. COOPER  2,621,101
TOLL COLLECTION TRANSACTION PRINTER
Filed Feb. 28, 1950  9 Sheets-Sheet 7

INVENTOR.
BENJAMIN COOPER
BY
J. B. Felshin
ATTORNEY

Dec. 9, 1952    B. COOPER    2,621,101
TOLL COLLECTION TRANSACTION PRINTER
Filed Feb. 28, 1950    9 Sheets-Sheet 8

INVENTOR.
BENJAMIN COOPER
BY J.B. Felshin
ATTORNEY

INVENTOR.
BENJAMIN COOPER
BY J. B. Felshin
ATTORNEY

Patented Dec. 9, 1952

2,621,101

UNITED STATES PATENT OFFICE 2,621,101

TOLL COLLECTION TRANSACTION PRINTER

Benjamin Cooper, New York, N. Y.

Application February 28, 1950, Serial No. 146,729

26 Claims. (Cl. 346—40)

This invention relates to printing registers and, more particularly, to transaction printing registers used in toll checking systems and the like.

In modern multi-lane toll collection stations, it is usual to provide centrally located, automatic printing registers using electrical pulse operated counting relays to print periodically such pertinent information as total forward and backward axle counts, the number of transactions for each of the various toll tariff classifications, the operator's identification number, etc. It is usual, in such installations, to have an electric clock connected with the printing register so that prints are made periodically, hourly, for instance. It is also usual to have additional prints automatically taken when a toll collector opens and closes a collection lane in a tour of duty in order that a complete record will be made of the transactions for which he is responsible.

In such a system, since there are many individual transactions between the automatic hourly prints, it is difficult, if not impossible, to trace the origin of toll collection errors.

Accordingly, it is an object of this invention to provide a transaction printer adapted to be connected, selectively, by a switch at said printer, or at a position remote from said printer, to any one of a plurality of toll collection lanes in order that a detailed record of the individual transactions of the operator in the lane selected can be obtained.

It is a further object of this invention to provide, in a transaction printing device of the character described, means to print the lane number of the particular lane monitored every time a transaction is registered.

It is another object of this invention to provide, in a transaction printing device of the character described, means for printing the time to the nearest minute along with the usual information, such as forward and reverse axle counts, tariff classification number registered and lane number.

It is still another object of this invention to provide, in a transaction printing device of the character described, printed indication means to differentiate between automatically made hourly prints and individual transaction prints.

A further object of this invention is to provide a highly improved, compact and rugged device, of the character described, which shall be easy to operate, relatively inexpensive to manufacture, positive in action and which shall have wide application, yet be practical and efficient to a high degree in use.

Other objects of this invention will in part be obvious and in part hereinafter pointed out.

This invention accordingly consists in features of construction, combinations of elements and arrangement of parts which will be exemplified in the construction hereinafter described and of which the scope of application will be indicated in the appended claims.

Fig. 3 is a left side elevational view of a device embodying the invention;

Fig. 4 is a front view detail drawing showing the letter "T" printing arm assembly;

Fig. 5 is a side view detail drawing showing the letter "T" printing arm assembly;

Fig. 6 is a cross-sectional view taken on line 6—6 of Fig. 2;

Fig. 7 is a cross-sectional view taken on line 7—7 of Fig. 2;

Fig. 8 is a cross-sectional view taken on line 8—8 of Fig. 2;

Fig. 9 is a detail drawing of the paper feed mechanism;

Fig. 10 is a cross-sectional view taken on line 10—10 of Fig. 9;

Fig. 11 is a detail drawing of the pressure roller assembly;

Fig. 12 is a cross-sectional view taken on line 12—12 of Fig. 1;

Fig. 14 is a detail of the paper take-up clamp;

Fig. 15 is an enlarged sectional detail drawing of the stepping switch assembly;

Fig. 16 is a cross-sectional view taken on line 16—16 of Fig. 15;

Fig. 19 is a sectional view taken on line 19—19 of Fig. 3;

Fig. 21 is a fragmentary view showing a modification of the invention providing for remote, electrical lane selection.

Figure 1:
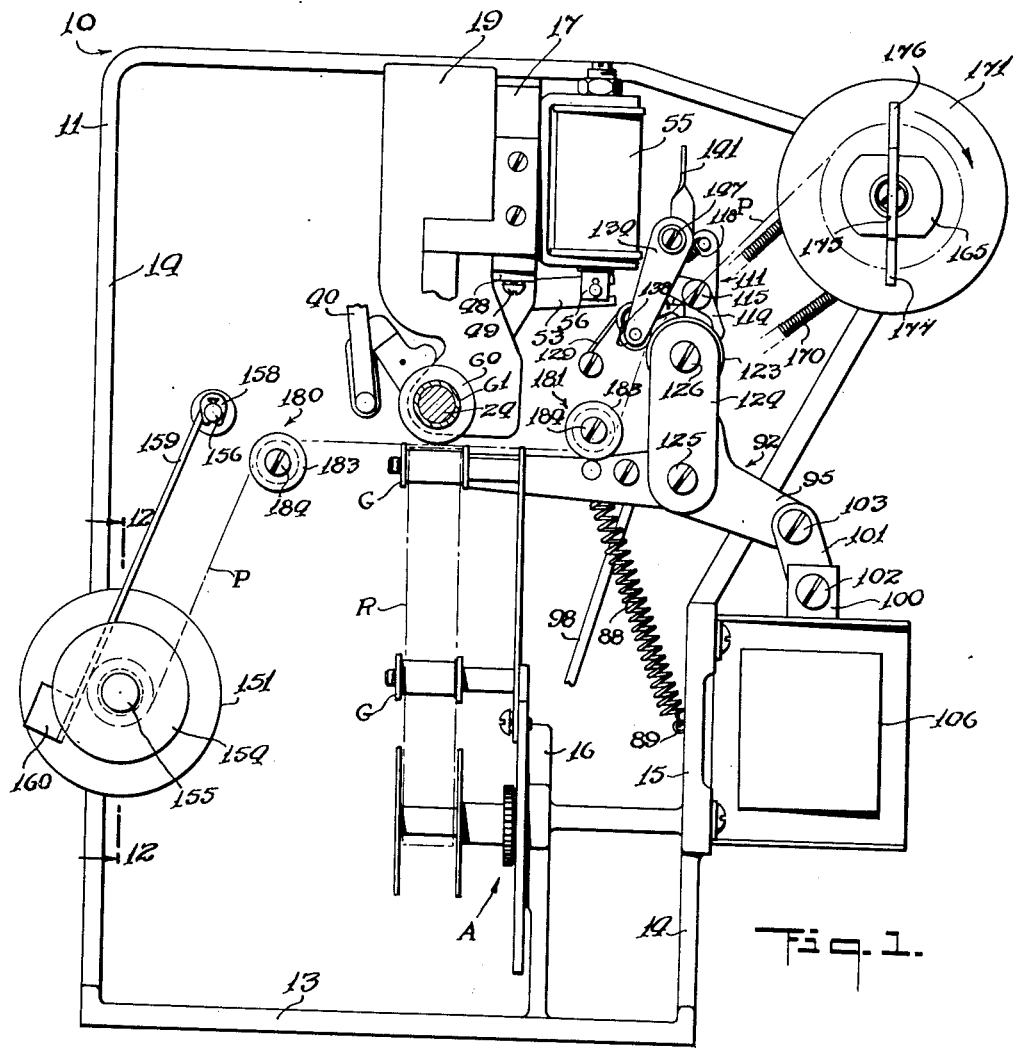
Fig. 1 is a front elevational view of a device embodying the invention.
Figure 2:
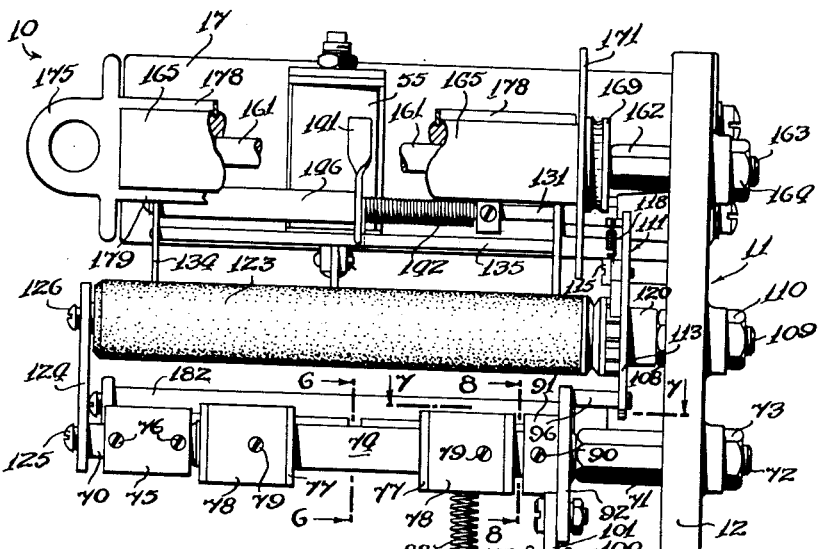
Fig. 2 is a right side elevational view of a device embodying the invention.

Referring now in detail to Figures 1, 2 and 3, of the drawings, 10 designates a printing register embodying the invention, comprising a frame 11 having a vertical face plate 12 and a horizontal base support 13. Said face plate has, for strengthening purposes, rearwardly extending from its edge, shoulders 14. Said face plate also has in it, for the purpose hereinafter explained, an opening 9. Extending rearwardly of said face plate and integrally formed therewith, are two horizontally disposed mounting bars 15 and 16, their purposes being hereinafter explained. Face plate 12 has rigidly fixed to it a rearwardly extending, rectangular relay mounting bar 17 positioned to have mounting surfaces perpendicular to said base support.

Fixed to the relay mounting bar 17, as by screws 18, are three shouldered members 19, each provided with a pair of depending shoulders 20 and 21. Fixed between the lower ends of each pair of said shoulders are horizontal, aligned shafts 22, 23 and 24.

Rotatably mounted on shaft 22 is a tariff classification number wheel 25 adapted to be acutated by pawl swing 26 (partially shown).

Rotatably mounted in shaft 23 are forward treadle count wheels 27, 28, 29 and 30 and reverse treadle count wheels 31 and 32 adapted to be actuated by pawl swings 33 and 34 (partially shown) to advance respectively said two sets of printing wheels.

Rotatably mounted on shaft 24 are date and time wheels 35, 36, 37, 38 and 39 for the month, day of the month, A. M. or P. M., hour and minutes, respectively, interconnected, in a manner known in the art, to advance automatically so as to show the correct time and date when a print is taken. Said wheels are actuated by pawl swing 40 (partially shown).

The pawl swings 26, 33, 34 and 40 are actuated by electromagnetic counting relays (not shown) such as disclosed in my patent for Electromagnetic Counter Units, No. 2,185,724, issued January 12, 1940. Said counter relays are energized by electric circuits hereinafter described.

Means is provided to print the lane number of the particular lane monitored every time a print is made. To this end, there is rotatably mounted on shaft 24 at its end extending through depending shoulder 21a, a lane number printing wheel 60, having on its periphery a plurality of numbers corresponding with the numbers of lanes to be monitored and its integrally formed bushing 61, spaced from said shoulder as by washer 62 and held rotatably thereon by washer 63 and screw 64.

Figure 20:
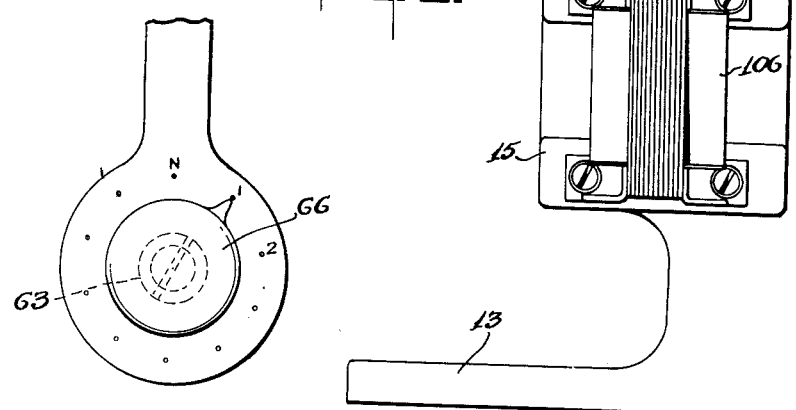
Fig. 20 is an end view of the manually operated lane selector switch taken on line 20—20 of Fig. 3.

There is, mechanically connected to said bushing for unitary motion therewith the rotor 65a of a single-pole multi-position electrical switch 65, having a position to close an electrical switch for each lane number selected (Figs. 3, 19 and 20). The stator 65b of said switch, having fixed thereon the switch contacts, is mounted for cooperation with rotor 65a as by a bracket 65c affixed to mounting bar 17. Said bushing also has mechanically connected to it a hand-operated calibrated selector dial 66, by which the selection of the particular lane to be monitored is made. The electrical circuit in connection with switch 65 is hereinafter described.

Means is provided to print each individual toll transaction (of the particular toll lane being monitored) and also to take prints automatically every hour on the hour, as is hereinafter described.

In order to differentiate between the regular transaction prints (that might occur on the hour) and regular automatic hourly prints, there is provided a printing mechanism adapted to move a printing slug into printing position to print the letter "T" along with the other printed information only when the print being made is in an automatic hourly print.

Said mechanism comprises a pair of mounting brackets 41 and 42 spaced by spacers 43 and 44 and riveted together by rivets 45 and 46 through said spaces, each of said mounting brackets having horizontally extending mounting arms 47 and 48 (Fig. 4). The mounting bracket assembly is fixed, as by screws 49, through said horizontally extending mounting arms to the underside of relay mounting bar 17. Rotatably fitted on a pin 50, horizontally positioned through and between said spaced mounting brackets, is a bell crank 51 having a downwardly extending arm 52 and a horizontally extending arm 53 in which there is a horizontal slot 54. Securely positioned against the rear of relay mounting bar 17, opposite shouldered members 19 and in alignment with bell crank 51 for cooperation therewith, is a solenoid 55 having a round, downwardly extending plunger 56. Said plunger is vertically slotted at its extending end to receive and cooperatively link with horizontally extending arm 53 as by headed pin 57. Said pin is held in place by a cotter pin 58.

Normally, solenoid 55 is de-energized and its plunger 56 extends downwardly, allowing bell crank 51 to rotate until downwardly extending arm 52 abuts against spacer 43. In this position the "T" printing slug end of arm 52 is out of printing alignment with printing wheels 25, 27, 28, 29 etc. and therefore the letter "T" will not be printed when prints are made. But when solenoid 55 is energized, by a circuit hereinafter described, it retracts its plunger 56 and moves the printing end of arm 52 into printing alignment.

As is hereinafter described, impressions of the indicia on the printing wheels are made on an automatically advanced strip of paper contained on paper-feed and paper-rewind rollers. The paper is fed interposed the printing wheels and an inked ribbon so that when struck at by printing hammers prints are made on the paper similar to typewritten impressions.

To this end, there is provided a printing hammer mechanism comprising a shaft 70 having a hexagonal shoulder portion 71 near its externally threaded end 72. Said shaft is mounted in face plate 12 in an inwardly extending position as by nut 73.

Rotatably fitted on said shaft against said shoulder portion is a sleeve 74, held in place to prevent longitudinal movement by a bushing 75, mounted on said shaft as by set screws 76. There are mounted on said sleeve, near each of its ends, two similar printing hammer assemblies (Figs. 6 and 7). Said printing hammer comprises a U-shaped member 77 rotatably mounted on sleeve 74 and held in place thereon by a bushing 78 affixed to said sleeve as by set screws 79. Said bushing has an under-lip 80 adapted to engage with a spacer rod 81 affixed between the arms of said U-shaped member as by screws 82. At the closed end of said U-shaped member there is horizontally disposed and mounted, as by rivets 83, a hammer member 84 having a groove 85 into which is cemented a rubber hammer piece 86. There is further provided, between the arms of said U-shaped member, a rod 87 adapted to hold one end of coil spring 88. The other end of said spring is connected under tension to a cotter pin 89 fixed in bracket 15 so that the printing hammers are normally held in a downwardly extending position. In the drawings, the printing hammers are shown in printing position.

There is also mounted on sleeve 74, as by set screw 90, at the end near the shoulder 71 a bushing 91 and its integrally connected crank member 92 having arms 93, 94 and 95. Arm 93 has affixed to it an inwardly extending pin 96 adapted to co-act with a paper-feed mechanism hereinafter described.

Arm 94 has a circular opening 97 to receive a connecting rod 98, partially shown, adapted to advance an inked ribbon R after each printing operation by means of a ribbon advance mechanism A, partially shown, such as, for example, disclosed in my patent for Electromagnetic Printing Counters, No. 2,115,410, issued April 26, 1938. The ribbon R is supported by ribbon guide rollers G so that the ribbon passes along the face of the printing wheels between the printing wheels and the paper.

Arm 95 is provided with a round opening 99 pivotally connected to a printing solenoid plunger 100 through a pivot link 101 connected therebetween as by pivot screws 102 and 103 held in place, respectively, by nuts 104 and 105.

Plunger 100 is associated with a solenoid mounted on bracket 15 and is adapted to be drawn down into said solenoid when it is electrically energized by a circuit hereinafter described.

From an inspection of the drawings it will now be evident that when said solenoid is energized the downward motion of its associated plunger 100 will, through connecting link 101 and crank arm 95, impart a clockwise rotational motion (Fig. 1) to sleeve 74 against the tensional force exerted by spring 88 attached to rod 87. Underlips 80, abutting against spacers 81, cannot move the printing hammers all the way for striking a print of the printing wheels against the paper but moves said printing hammers to a position just short of striking a print. The angular momentum thus imparted the hammers by the action of the solenoid in this manner further carries the hammers so that they strike so as to make a single, well-defined print and then fall to rest again against the lips 80, no matter how long thereafter 106 remains energized.

A paper feed mechanism is provided to advance the printing paper P each time a print is struck. Said mechanism (Figs. 9 and 10) comprises a shaft 107 having a hexagonal shoulder portion 108 near its externally threaded end 109. Said shaft is mounted in face plate 12 in an inwardly extending position as by nut 110. Rotatably fitted on said shaft and against said shoulder portion is a bell crank member 111 having arms 112 and 113. Arm 112 is equipped on its outer side with rotatably mounted pawl member 114, mounted as by screw 115 and having a toothed end 116 and an opposite end 117. Said opposite end is provided with a hole in which is fixed one end of a coil spring 118, the other end of said spring being fixed to an outwardly extending stud 119 located at the end of arm 112 so that pawl 114 will be constrained by the force of said spring, against counter-clockwise motion with respect to arm 112 (Fig. 10).

Arm 113 has a slot 113a adapted to receive pin 96 on crank member 92 so that the paper feed mechanism is cooperatively connected to the printing mechanism.

There is also rotatably mounted on shaft 107 a bushing 120 having at its inward end and against bell crank member 111 a ratchet wheel 121 affixed thereto in position to act cooperatively with pawl 114. Next to said ratchet wheel there is, fixed on bushing 120, a grooved pulley wheel 122 adapted to drive a paper wind spool through the use of an interconnecting spring belt as is hereinafter described. Bushing 120 has cemented to it a rubber paper feed roller 123. Between the outer ends of rod 70 and rod 107 there is provided a strengthening link 124 rigidly interconnecting the ends of said rods through the use of screws 125 and 126 (shown in Fig. 2).

There is further provided, for cooperative action with ratchet wheel 121, a pawl 127 rotatably mounted on a pin 128 fixed in face plate 12. Said pawl is held against said ratchet wheel by the torsional force imparted by coil spring 129 circumjacently disposed said stud between face plate 12 and said pawl and having one end conformed around the upper edge of said pawl and the other end fixed relative to said front plate as by screw 130.

It will now be evident from an inspection of the drawings, that when solenoid 106 is energized, making a print, at the same time the cooperative movement of bell crank member 111 will, through the action of pawl 114, advance ratchet wheel 121 causing its paper advance bushing 120 and the attached paper roller 123 to rotate so as to frictionally drive the paper P into a new printing position. When the printing solenoid is thereafter de-energized, effecting a corresponding counter-clockwise motion of bell crank member 111, printing roller 123 will be held against retrograde motion by the action of pawl 127 against the last advanced cooperative tooth on ratchet wheel 121.

Means is provided to hold a pressure roller against the paper in contact with the paper roller so that a greater frictional driving force will be imparted to the paper. To this end, there is provided a shaft 131 (Fig. 11) having a hexagonal shoulder portion 132 near its externally threaded end. Said shaft is mounted in face plate 12 in an inwardly extending position as by a nut (not shown). Rotatably mounted on said shaft are a pair of lever arms 133 and 134, one being positioned against the inner end of said shoulder portion and the other at the opposite end of said shaft. There is a spacer 135 rigidly fixed between said lever arms interconnecting them so that they are rotatable about said shaft only in unison. At the remote ends of said lever arms and rotatably mounted therebetween in bearing holes 136 and 137 is a pressure roller 138.

Means is provided to hold said pressure roller against the paper and printing roller. To this end, there is circumjacently disposed on said shaft between a spring stop bushing 139, securely mounted on said shaft as by set screw 140, and a rotatably mounted pressure roller release lever 141, a coil spring 142 having one end 143 fixed in a horizontal hole in said spring stop bushing and its other end 144 abutting against said spacer so that the pressure roller 138 is held effectively against the printing roller 123. Pressure roller release lever 141, having an underlip 145 abutting against the side of spacer 135 at a position adjacent spring end 144, is fixed to a bushing 146 rotatably mounted on shaft 131. Said bushing and lever arm 134 are held against longitudinal movement on said shaft as by the underhead of a screw 147 mounted in the end of said shaft. Lever 141 is adapted to be manually rotatable against the torsional force of spring 142 away from paper roller 123 so that a new roll of paper may be more easily threaded on the transaction printer.

Printing paper roll unwind and take-up means is provided to store and automatically advance the printing paper each time a print is made. To this end, there is a paper spool shaft 148 having a partly threaded reduced diameter 149 at one end forming an annular shoulder 150 against which a circular paper spool guide 151 is axially mounted (Fig. 12). Said shaft is rigidly fixed, in an inwardly extending position, to face plate 12 as by nut 152. Circumjacent said shaft, between the inner side of said face plate and spool guide 151, is a spacer bushing 153. Said paper spool shaft is adapted to rotationally hold a spool of paper, having therefor end holding means comprising a circular spool guide 154 held on the end of said shaft by a knurled machine nut 155.

There is provided friction means to prevent the paper spool from unwinding freely under the influence of angular momentum. To this end, there is provided a paper spool weight shaft 156 having a hexagonal shoulder portion 157 near an externally threaded end. Said shaft is mounted in face plate 12 in an inwardly extending position as by a nut (not shown). Rotatably fitted on said shaft and held thereon as by spring clip 158 is a flat paper spool friction piece 159 looped at one end to fit on said shaft and weighted at the other end as by weight piece 160 fixed thereon, the whole being adapted to gravitationally rest its lower weighted end against the paper on the paper spool so as to frictionally dampen any free unwinding of the paper.

Figure 13:
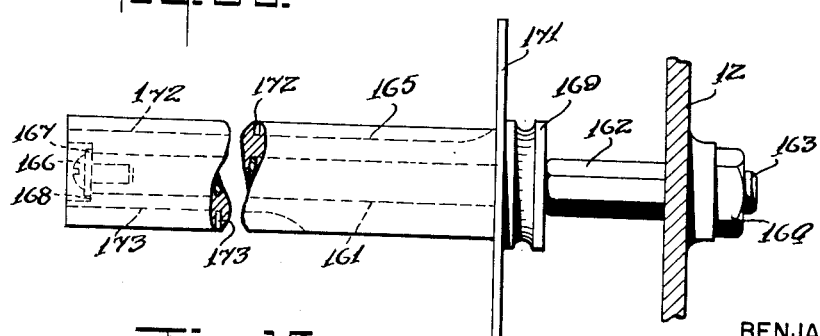
Fig. 13 is a detail drawing of the paper take-up spool.

Paper take-up means is provided to automatically rewind the printed paper. To this end, there is provided a paper take-up shaft 161 having a hexagonal shoulder portion 162 near its externally threaded end 163. Said shaft is securely fixed, as by nut 164, in face plate 12 in an inwardly extending position. Rotatably positioned on said paper take-up shaft is a paper take-up spool 165 held thereon from endwise movement as by a screw 166 and a washer 167, held thereby, against the shoulder portion 168 of the countersunk end of said paper take-up spool (Fig. 13). The inward end of said paper take-up spool has formed thereon a grooved pulley 169 adapted to co-act with the spring belt 170 for rotational advancement of said paper take-up spool. Coaxially positioned on the paper take-up spool, against the side of pulley 169, is a circular paper edge guide disk 171. The paper take-up spool is further provided with longitudinal diametrically opposite rectangular grooves 172 and 173, both communicating with the outer end of the spool. Groove 172 extends substantially the length of said spool to the pulley 169. Groove 173 extends to about one-half the length of said spool. There is further, for cooperative use with said paper take-up spool, a paper take-up clamp 174 (Fig. 14). Said clamp is a flat piece comprising handle part 175, shoulder portions 176 and 177 and horizontally extending groove fitting fingers 178 and 179, the whole being adapted to fit on and slide longitudinally on paper spool 165 and at the same time to hold the end of the paper P in groove 172 by the clamping action of finger 178 therein. The shoulders 176 and 177 serve as a guide so that the paper winds squarely on the spool. Fingers 178 and 179, being deeper than the grooves they fit into, project somewhat therefrom and when the rewound printed paper is removed exert a frictional force against the inside of the rolled paper so that it is easily removable upon the withdrawal of the paper take-up clamp 175.

There are further provided two horizontal positioning paper guide shafts 180 and 181, one on either side of the printing wheel faces and in horizontal alignment therewith so that the paper is fed horizontally past the printing wheel faces between them and the inked ribbon R. Said guide shafts comprise a rod 182 undercut and threaded at one end to be bolted in face plate 12 in an inwardly extending position. The free ends of said rods are internally threaded to hold end guide washers 183, as by screws 184, for lateral paper guidance.

The overall operation of the paper advance, print and rewind mechanism is briefly stated as follows: An unused paper roll is first placed on paper spool shaft 148 and threaded through the printer following a course, indicated by the dotted line in Fig. 1 over paper guide shaft 180, between the printing wheels and the inked ribbon R, under guide shaft 181, over paper feed roller 123 (first having withdrawn pressure roller 138 by manual force on lever 141 as hereinbefore explained), to paper take-up roller 165 whereon it is clamped as described using clamp 174. When a print is made, as hereinbefore explained, the inked ribbon R is advanced, the paper mechanism advances the paper sufficiently for a new print and at the same time, paper take-up shaft 161, coupled to paper feed roller 123 by the spring In connection with the electrical circuit for the printer and for the purpose hereinafter described, is a stepping switch S associated with tariff classification number wheel 25 (Figs. 15 and 16). Briefly, said switch is a single pole, multi-position rotary switch connected to and adapted to be rotatably switched by wheel shaft 22. Said switch is affixed to the outer side of shoulder 20a and extends through hole 9 in face plate 12 as shown in Fig. 1.

Said stepping switch comprises an axial, rotatable member 185 holding a pair of movable, interconnected contacts, and a fixed member 186, holding a plurality of fixed contacts and a single commutator cooperatively disposed with respect to rotatable member 185 so that electrical circuits are successively completed between the commutator and the fixed contacts as the rotatable member is advanced or "stepped."

Member 185 consists of a bushing 187 having a reduced diameter portion 188. Mounted against shoulder 189, formed by said reduced diameter, is an insulating washer 190 having a reduced diameter portion 191. Said reduced diameter forms an insulating shoulder 192 against which are positioned a pair of co-acting interconnected contactors 193 and 194. There is further fitted on the reduced portion of said insulating washer, against said contactors, an insulating washer 195, the whole assembly being held securely together by a nut 196 threaded on reduced diameter portion 188. Fixed member 186 comprises outer annular supporting members 197 and 198, inner insulating annular members 199 and 200 and a central annular contactor supporting insulator 201 having positioned against one side the annular commutator piece 202 and against the other side, radially and equidistantly disposed about the circumference of said supporting insulator, contactors 203. Said fixed member parts are held together as by machine screws 204 insulated from said commutators and contactors as by insulating bushings 205.

Members 185 and 186 are so co-axially disposed that contactor 194 rests on commutator 202 and contactor 193 rests on one of the opposite contactors 203.

Fixed member 186 of the stepping switch is rigidly mounted on the outer side of shoulder 20, associated with the tariff counter as by three screws 204 passing through spacers 206 and into said shoulder. Member 185 is securely fixed on shaft 22 so as to be rotated or "stepped" therewith at the same time the associated relay advances the printing wheel mechanism.

Figure 17:
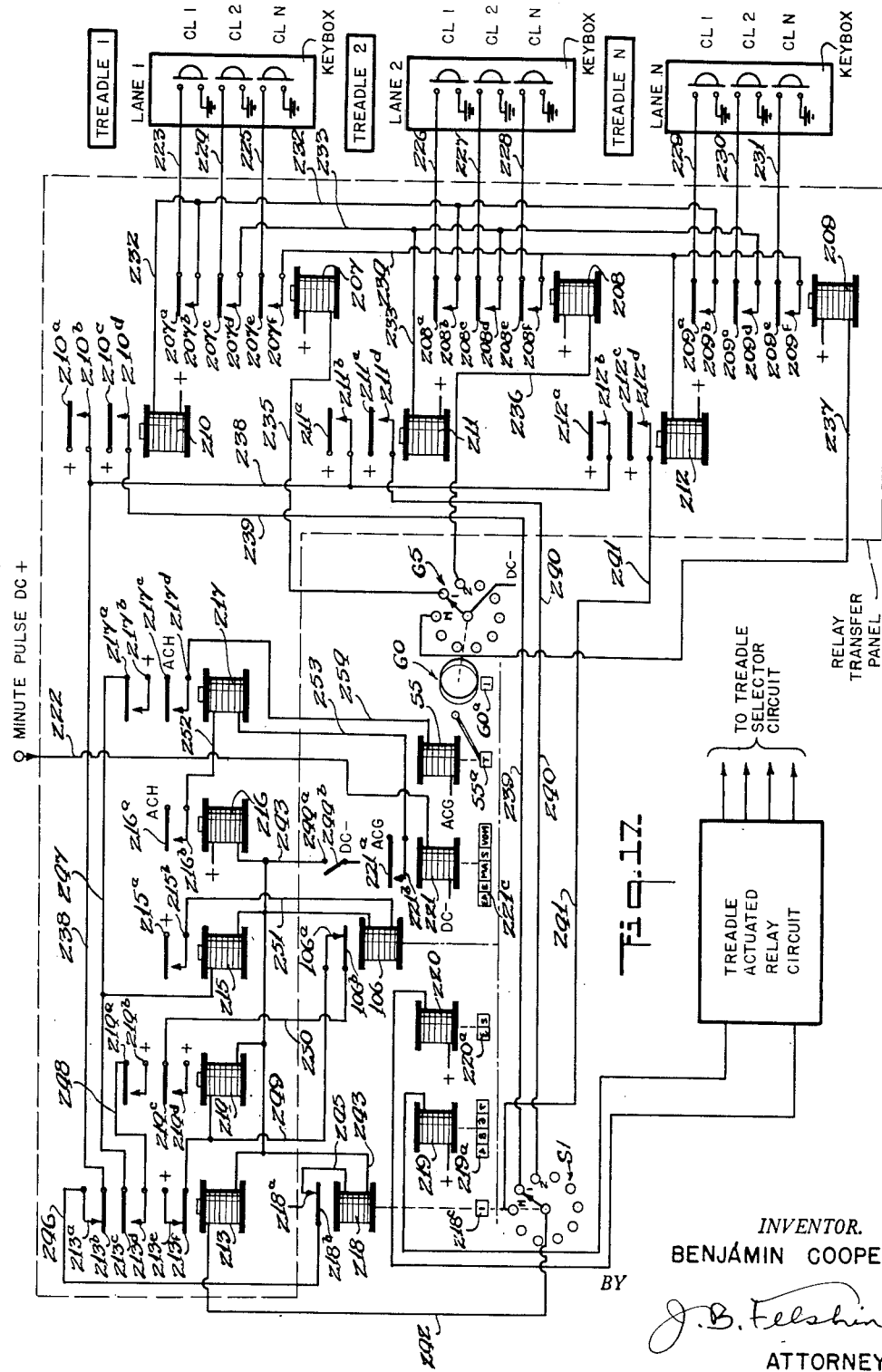
Fig. 17 is a schematic diagram of the electrical circuit associated with the device.

Fig. 17 is a schematic diagram of the electrical circuit associated with the transaction printer. The circuit comprises a plurality of tariff classification switches CL1, CL2, etc. (CL1, CL2, and CLN only, being shown) in a plurality of keyboxes designated Lane 1, Lane 2 and Lane N, there being one keybox for each collection lane. The switches CL1, etc. are normally open but adapted to close-circuit to ground when pressed for a registration.

Associated with each keybox there is an auxiliary relay 207, 208 and 209, respectively, each having a plurality of pairs of normally open switches, there being one for each tariff classification number, adapted to be closed-circuited when their respective relay is energized. These switches are designated 207a, 207b; 207c, 207d; 207e, 207f; 208a, 208b, etc.

There is provided a plurality of auxiliary relays, one for each classification numbers CL1, CL2, and CLN. Each of said relays has, associated with it, two pairs of normally open switches adapted to be closed when their respective relay is energized. These switches are designated 210a, 210b; 210c, 210d; 211a, 211b; 211c, 211d; etc.

There are further provided auxiliary relays 213, 214, 215, 216 and 217. Relay 213 has, associated with it, switches 213a, 213b and 213e, 213f, normally closed but adapted to be opened when said relay is energized and a switch 213c, 213d, normally open but adapted to be closed when said relay is energized.

Relay 214 has, associated with it, switch 214a, 214b and 214c, 214d normally open but adapted to be closed when said relay is energized.

Relay 215 has associated with it switch 215a, 215b, normally open but adapted to be closed when said relay is energized.

Relay 216 has associated with it switch 216a, 216b normally open but adapted to be closed when said relay is energized.

Relay 217 has associated with it switches 217a, 217b and 217c, 217d, each normally open but adapted to be closed when said relay is energized.

The auxiliary relays 207 through 217 are preferably located separately from the lane keyboxes and the transaction printer and are in a unit referred to as a "Relay Transfer Panel." For this reason, these relays in the diagram are shown within a dotted line enclosure.

Relay 218 is the tariff classification number relay associated with pawl swing 26. Said relay also has associated with it a switch 218, 218b normally closed but adapted to be opened when the relay is energized. A representation of the face of the tariff classification number printing wheel in printing position is shown below the relay and designated 218c. As hereinbefore described, there is also a stepping switch S1 associated with the tariff classification number relay 218, mechanically connected so as to be rotated with the printing wheel.

Relays 219 and 220 are the forward treadle count relay and the reverse treadle count relay adapted to actuate pawl swings 33 and 34. Representations of the printing faces of the printing wheels associated with said relays are shown below the relays and designated 129a and 220a.

Relay 221 is the date and time relay adapted to actuate pawl swing 49. Representations of the printing faces of the printing wheels associated with said relay is shown below the relay and designated 221c. Said relay has associated with it a switch 221a, 221b, normally open but adapted to be closed for an instant, through the use of a mechanism known in the art and not herein described, at the moment when the associated print wheels advance to print the even hour. Said relay has one terminal connected to the negative source of D. C. voltage supply and its other terminal connected by wire 222 to a pulsing circuit, controlled by a remote master clock, not shown, supplying a short pulse of positive D. C. voltage every minute for the regular, synchronous, advancement of said time relay.

Solenoid or relay 55, as hereinbefore described, is adapted when energized to move "T" printing slug 55a, shown below said relay, into printing position so as to print along with the other printed information.

Below lane number printing wheel 60, there is shown a representation of its printing face 60a. Selector switch 65 and selector dial 66 are mechanically interconnected with printing wheel 60, as is hereinbefore described.

Printing solenoid 106 has associated with it a switch 106a, 106b, normally closed but adapted to be opened when said solenoid is energized.

In lane 1, keybox button CL1 is connected by wire 223 to switch arm 207a, button CL2 is connected by wire 224 to switch arm 207c and button CLN is connected by wire 225 to switch arm 207e.

In lane 2, keybox button CL1 is connected by wire 226 to switch arm 208a, button CL2 is connected by wire 227 to switch arm 208c and button CLN is connected by wire 228 to switch arm 208e.

In lane N, keybox button CL1 is connected by wire 229 to switch arm 209a, button CL2 is connected by wire 230 to switch arm 209c and button CLN is connected by wire 231 to switch arm 209e.

Switch arms 207b, 208b and 209b are connected in parallel to the common wire 232 which also connects with one terminal of relay 210.

Switch arms 207d, 208d and 209d are connected in parallel to the common wire 233 which also connects with one terminal of relay 211.

Switch arms 207f, 208f and 209f are connected in parallel to the common wire 234, which also connects with one terminal of relay 212.

The remaining terminals of relays 210, 211 and 212 are connected to the source of positive D. C. voltage supply.

One terminal each of relays 207, 208 and 209 is connected to the source of positive D. C. voltage supply.

The remaining terminal of relay 207 connects by wire 235 to fixed contact number 1 of lane selector switch 65, the remaining terminal of relay 208 connects by wire 236 to fixed contact number 2 of said switch and the remaining terminal of relay 209 connects by wire 237 to fixed contact member N of said switch.

The movable contact arm of lane selector switch 65 is connected to the source of negative D. C. voltage supply, which is at ground potential.

It will now be evident that when the lane selector switch 66 is turned to the particular position to monitor a given lane, lane 1 for example, the mechanically connected printing wheel 65 will correspondingly be turned to the position to print the lane number 1 and at the same time an energization circuit will be completed to operate the auxiliary relay 207 associated with lane 1. This circuit can be seen to be from D. C.— to the movable selector arm in switch 65, contact 1, wire 235, through relay 207 to D. C.+. Thus the switches 207a, 207b; 207c and 207d and 207e, 207f will each be closed, allowing the classification number auxiliary relays 210, 211 and 212 to be energized when their respective associated classification buttons CL1, CL2 and CLN in the keybox of lane 1 are depressed for a registration. Energization circuits are from ground, through lane 1 classification button CL1, wire 223, switch 207a, 207b, wire 232, through relay 210 to D. C.+ when button CL1 in lane 1 is depressed; from ground through lane 1 classification button CL2, wire 224, switch 207c, 207d, wire 233, through relay 211 to D. C.+ when button CL2 in lane 1 is depressed; and from ground, through lane 1 classification button CLN, wire 225, switch 207e, 207f, wire 234, through relay 212 to D. C.+ when button CLN in lane 1 is depressed. Since relays 208 and 209 are de-energized when their corresponding lane number is not selected, the depression of classification buttons in lanes other than the lane selected will have no effect on the transaction printer.

Switch arms 210b, 211b and 212b, respectively, of relays 210, 211 and 212 are connected in parallel to common wire 238 which also connects with switch arm 213b of relay 213. Switch arm 210d is connected by wire 239 to fixed contact 1 on stepping switch S; switch arm 211d is connected by wire 240 to fixed contact 2 on said switch and switch arm 212d is connected by wire 241 to fixed contact N on said switch. Switch arms 210a, 210c, 211a, 211c, 212a and 121c, associated with relays 210, 211 and 212 are all connected to D. C.+.

The movable arm associated with stepping switch S1 is connected by wire 242 to one terminal of relay 213. The other terminal of said relay is connected in parallel with one terminal each of relays 106, 214, 125, 216 and 218 to the common wire 243 which connects to a terminal 244a of switch 244a, 244b. Terminal 244b of said switch is connected to D. C.—. The other terminal of relay 218 is connected by wire 245 to its associated switch arm 218a. Switch arm 218b is connected by wire 246 to switch arm 213a associated with relay 213.

The operation of the stepping relay and switch can now be understood as follows: Suppose lane 1 to be selected and classification button N of lane 1 depressed. Relay 212 will then be energized and its switches 121a, 212b and 212c, 212d will be closed. An energizing circuit will thus be completed to relay 218 from D. C.+ through closed switch 212a, 212b, wire 238, closed switch 213a, 213b, wire 246, closed switch 218a, 218b, wire 245, relay 218, wire 243 and closed switch 244a, 244b to D. C.—. However, since relay switch 218a, 218b will be opened when its relay 218 is energized, thus again opening its energizing circuit, the relay will automatically be cyclically energized and de-energized for "stepping" or advancing its associated pawl and ratchet mechanism and the mechanically connected stepping switch S1. When the movable contact of stepping switch S1, reaches contact N, corresponding to the number of the classification button depressed, a circuit will be completed which, in effect, will open the energizing circuit to relay 218 and thus stop further "stepping." This circuit is traced from D. C.+, through switch 212c, 212d associated with relay 212, wire 241, stepping switch contact N., the stepping switch contact arm, wire 242, relay 213, wire 243 and closed switch 244a, 244b to D. C.—. Relay 213, now being energized, has opened its switch 213a, 213b and broken the circuit to relay 218 preventing it from further stepping. The mechanically interconnected classification number printing wheel will now be in position to print the classification number N, corresponding to the classification number button depressed.

Switch arm 213c, is connected by wire 247 to switch arm 217a and also to the remaining terminal of relay 215; switch arm 213d is connected by wire 248 to switch arm 214a; switch arm 213e is connected to D. C.+ and switch arm 213f is connected by wire 249 to the remaining terminal of relay 214 and also to switch arm 106a.

Switch arms 214b and 214d are connected to D. C.+. Switch arm 214c is connected by wire 250 to switch arm 106b.

Switch arm 215a is connected to D. C.+ and switch arm 215b is connected by wire 251 to the remaining terminal of relay 106.

The remaining terminal of relay 216 is connected to D. C.+. Switch 216a is connected to one terminal of a source of A. C. supply voltage, ACH. Switch arm 216b is connected by wire 252 to one terminal of relay 217. The remaining terminal of relay 217 is connected by wire 253 to switch arm 221b. Switch arm 221a is connected to the other terminal of the source of A. C. supply voltage, ACG.

Switch arm 217b is connected to D. C.+. Switch arm 217c is connected to the one terminal of a source of A. C. supply voltage ACH. Switch arm 217d is connected by wire 254 to one terminal of solenoid 55. The other terminal of said solenoid is connected to the other terminal of the source of A. C. supply voltage, ACG.

The operation of the printing circuits is as follows: Normally, the relay 214 is energized through the circuit from D. C.—, through wire 243, relay 214, normally closed switch 213e, 213f to D. C.+. After a registration button in a lane being monitored is depressed and stepping relay 218 has advanced its printing wheel to the corresponding number and is ready for a print to be taken, relay 213 becomes energized as hereinbefore explained. Even though the energization of relay 213 will open switch 213e, 213f, and thus open the above described energization circuit for relay 214, said relay will remain energized temporarily through the new energization circuit from D. C.— through wire 243, normally closed switch 106a, 106b, wire 250, now closed switch 214c, 214d to D. C.+. Moreover, at the same time, an energization circuit is completed to the slower operating printing solenoid 136. This circuit is traced from D. C.— through wire 243, solenoid 106, wire 251, now closed switch 215a, 215b, to D. C.+, the auxiliary printing relay 215 now being temporarily energized by a circuit from D. C.— through relay 125, wire 247, closed switch 213c, 213d, wire 248, closed switch 214a, 214b to D. C.+.

Now that printing solenoid 106 is energized, a print will be made and the transaction printer operated as hereinbefore described. However, as soon as a print is made, switch 106a, 106b associated with the printing solenoid will be opened, opening the hereinbefore described energization circuit through said switch for relay 214, which, in turn, interrupts the above detailed energization circuits for auxiliary printing relay 215 and printing solenoid 106. Since the switch 214c, 214d associated with relay 214 is now open, relay 214 being de-energized, the subsequent closure of switch 106a, 106b cannot make an energizing circuit for relay 214, therefore, switch 214a, 214b will remain open and another printing operation is not effected.

Since the operation of the stepping relay and the other relays is rapid, the printing operation takes place practically instantly upon the pressing of a classification button. After a print is made and the classification button switch is thereafter opened, relay 213 will be de-energized, allowing relay 214 again to become energized through switch 213e, 213f. But, at the same time, switch 213c, 213d is opened, interrupting the circuit to auxiliary printing relay 215 and thus preventing extra prints from being made. The printing circuits are now in readiness for another cycle of operation initiated by the depression of the same tariff classification number button or another tariff classification number button in the lane being monitored.

Provision is made for the printer to automatically make prints on the hour. As hereinbefore described, the time relay 221 is adapted to momentarily close switch 221a, 221b on the hour. When this is done, an energization circuit for relay 217 is completed from ACG through switch 221a, 221b wire 253, relay 217, wire 252, closed switch 216a, 216b to ACH; the relay 216 being closed whenever the transaction printer is in use because of its energization by the circuit from D. C.— through apparatus switch 244a, 244b, wire 243, relay 216 to D. C.+. Relay 217, being energized, will, through its associated switch 217c, 217d, close an energization circuit for "T" printing solenoid 55, the circuit being from ACG, through solenoid 55, wire 254, switch 217c, 217d to ACH. At the same time, an energization circuit will be completed to auxiliary printing relay 215, closing its switch and thus effecting the making of a print. As hereinbefore described, the hourly print will be distinguished from transaction prints by the printing, along with the other information, of the letter "T."

Forward and reverse treadle count relays 219 and 220 are energized by the actuation of the treadle contacts associated with the treadle of the lane selected for monitoring through the use of a treadle actuated relay circuit such as is disclosed in applicant's Patent No. 2,313,627, issued March 9, 1943, titled: Treadle Controlled Toll Checking System.

Figure 22:
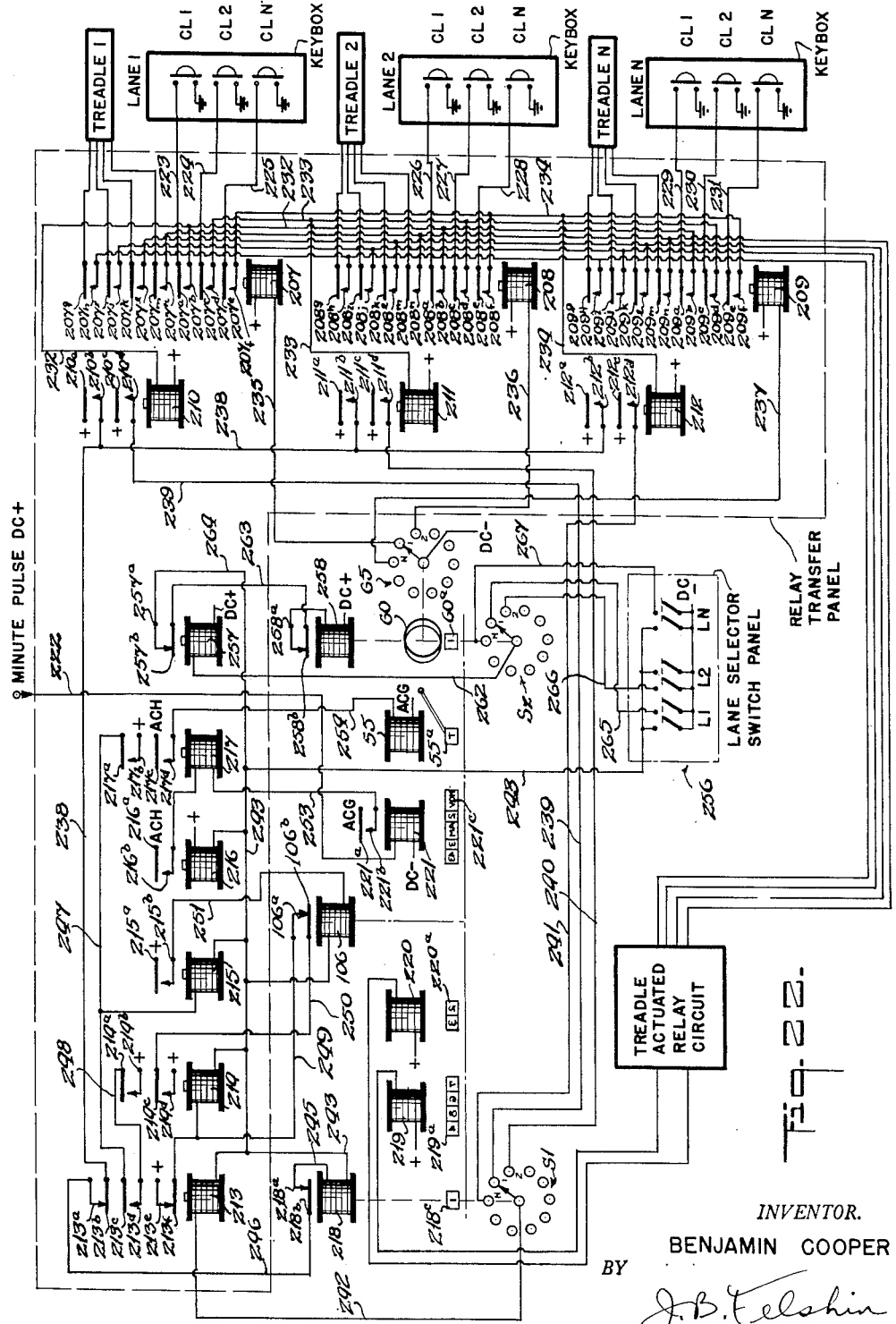
Fig. 22 is a schematic diagram of the electrical circuit associated with the device as modified for remote lane selection.

The selecting circuit for accomplishing this is a duplication of the selection of the keybox classification button circuits and may be accomplished by the use of the additional switches 207g, 207h; 207i, 207j; 207k, 207l; 207m, 207n; 208g, 208h, etc. on the lane selector relays 207, 208 and 209; as shown in Fig. 22. Thus, when a particular lane is selected to be monitored, its associated treadle will be connected to the transaction printer through the treadle actuated relay circuit to actuate the forward and reverse axle counter relays 219 and 220. It should be noted that by the expedient of employing a separate treadle actuated relay circuit, rather than switching to the output of the particular treadle relay circuit in the individual lane registers, a check can be made of the operation of the individual lane treadle relay circuits; and, should an individual lane treadle relay circuit fail, the transaction printer could be used temporarily to make a record of the treadle count for that lane.

Figure 18:
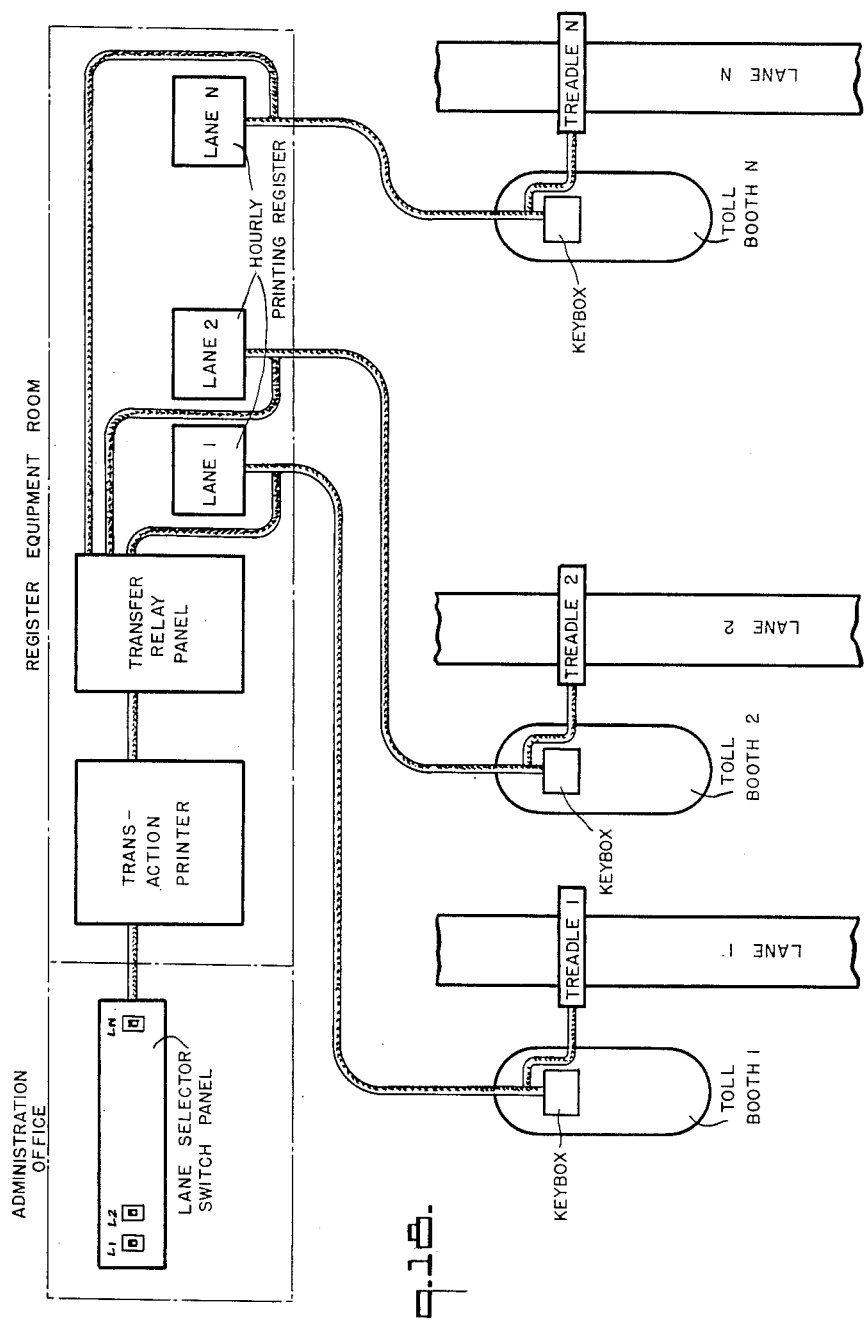
Fig. 18 is a block diagram showing how a device embodying the invention may be incorporated in a toll checking system.

Fig. 22 shows a modification of the invention providing for remote selection of the lane to be monitored through the use of an electrically connected lane selector switch panel 256 having a plurality of double pole single throw toggle switches L1, L2, LN, one for each lane in the system (Figs. 18 and 22). Said switch panel is interconnected in the circuit with a stepping switch S2, similar in construction to S1, an auxiliary relay 257 and a stepping relay 258, as hereinafter described.

Fig. 21 shows the mechanical details of the modification of the transaction printer (as shown in Fig. 3) providing for remote switching. Relay mounting bar 17 is extended to provide for the mounting of stepping relay 258 in an additional shoulder member 19 provided with a pair of depending shoulders 20b and 21b. Fixed between the lower ends of said shoulders is a horizontal shaft 259 aligned with shafts 22, 23 and 24. The lane number printing wheel 60 in this instance is fixed on shaft 259 at the outer side of shoulder 20b. Pawl swing 260 is actuated by the stepping relay 258 when pulsed so as to rotatively advance shaft 259 and printing wheel 60. A stepping switch S2, similar in construction to S1 hereinbefore described, is similarly mounted to the outer side of depending shoulder 21b for cooperative switching upon the rotative advancement of shaft 259. There is further the rotor 65a of switch 65 fixed to said shaft, its stator 65b being cooperatively mounted therewith as by mounting bracket 261 affixed to mounting bar 17.

Referring now to Fig. 22, relay 257 is provided with a pair of switch contacts 257a, 257b normally closed but adapted to be opened when said relay is energized. Relay 258 is likewise provided with a pair of switch contacts 258a, 258b, normally closed but adapted to be opened when said relay is energized. Each of said relays has one of its energization terminals connected to the source of voltage supply D. C.

The remaining energization terminal of relay 257 is connected by wire 262 to the rotor of stepping switch S2. The remaining energization terminal of relay 258 is connected to its switch contact arm 258a. The switch arms 257b and 258b of said relays are interconnected by wire 263. Switch contact arm 257a is connected as by wire 264 to wire 243 which is connected in common with one fixed pole each of the double pole, single throw switches L1, L2, LN in the lane selector switch panel 256. The remaining fixed poles of said switches are connected by wires 265, 266 and 267 respectively to the stator contacts 1, 2 and N of stepping switch S2. All the opposite switch arm poles of switches L1, L2 and LN are connected in common to D. C.

The operation of the remote lane selector in connection with the stepping switch S2 is similar to the operation of stepping switch S1 associated with the classification number circuits hereinbefore described. Thus if the apparatus is set to monitor lane 2 by closing switch L2, the stepping relay S2 will be stepped until its rotor makes contact with fixed contact 2, when a circuit will be completed to energize auxiliary relay 257, opening the energizing circuit for relay 258 and preventing its further rotation of printing wheel 60. Said lane number printing wheel will then be in position to print the figure 2 and switch 65 at the same time will be switched to monitor the classification number circuits and treadle circuits associated with lane No. 2 as hereinbefore explained.

It will be noted that in this modification the energizing of the apparatus through wire 243 is accomplished only when a lane selection is made (i. e., when one of the lane selector toggle switches L1, L2 etc. is in monitoring position), so as to prevent stepping relay 258 from being energized at a time when the rotor of stepping switch S2 cannot find an energized contact to open the energization circuit to relay 258.

Fig. 18 is a block diagram showing how a remotely controlled transaction printer may be incorporated in a toll checking system. It will be seen that the lane selector switch panel is in a separate administration office room and that the transaction printer is located with other electrical recording equipment in the register equipment room.

It will thus be seen that there is provided a device in which the several objects of this invention are achieved and which is well adapted to meet the conditions of practical use.

As various possible embodiments might be made of the above invention and as various changes might be made in the embodiment set forth, it is to be understood that all matters herein set forth or shown in the accompanying drawings are to be interpreted as illustrative and not in a limiting sense.

Having thus described my invention, I claim as new and desire to secure by Letters Patent:

1. In a transaction printer adapted for use in connection with a toll collection system including a keybox having a plurality of button switches for registering a plurality of different toll collection rates, the combination comprising, an electric stepping relay, an axial shaft, a classification printing wheel with printing indicia thereon, comprising different indicium for each one of said button switches, said printing wheel being fixed on said axial shaft and adapted to be controlled by said stepping relay so as to successively move different indicium thereon into printing position, a rotary switch having a rotor fixed to said axial shaft and a stator cooperatively disposed with respect to said rotor, means to make a printed record of indicium on said classification printing wheel, and electric circuit means, interconnecting said button switches, said stepping relay, said rotary switch, and said printing means, to move the indicium corresponding to the keybox button switch actuated into printing position.

2. In a transaction printer adapted for use in connection with a toll collection system including a keybox having a plurality of button switches for registering a plurality of different toll collection rates, the combination comprising, an electric stepping relay, an axial shaft, a classification printing wheel with printing indicia thereon comprising different indicium for each one of said button switches, said printing wheel being fixed on said axial shaft and adapted to be controlled by said stepping relay so as to successively move different indicium thereon into printing position, a rotary switch having a rotor fixed to said axial shaft and a stator cooperatively disposed with respect to said rotor, means to make a printed record of indicium on said classification printing wheel, and electric circuit means, interconnecting said button switches, said stepping relay, said rotary switch, and said printing means, to move the indicium corresponding to the keybox button switch actuated into printing position, and immediately thereafter make a print thereof.

3. In a transaction printer adapted for use in connection with a toll collection system including a keybox having a plurality of button switches for registering a plurality of different toll collection rates, the combination comprising, an electric stepping relay, an axial shaft, a classification printing wheel with printing indicia thereon, comprising different indicium for each one of said button switches, said printing wheel being fixed on said axial shaft and adapted to be controlled by said stepping relay so as to successively move different indicium thereon into printing position, a rotary switch having a rotor fixed to said axial shaft and a stator cooperatively disposed with respect to said rotor, means to make a printed record of indicium on said classification printing wheel, electric circuit means, interconnecting said button switches, said stepping relay, said rotary switch, and said printing means, to move the indicium corresponding to the keybox button switch actuated into printing position, a second relay, a printing slug with printing indicia thereon adapted to be brought into printing position by said second relay when energized, means in printing position to indicate the date and time to the nearest minute, means controlled by said time indicating means operative on the even hour to make a print of the count, the last classification indicium, the date and time and at the same time energize said second relay, so that hourly prints are characterized by the printing indicia of said printing slug.

4. In a transaction printer adapted for use in connection with a toll collection system including a highway lane for vehicular transit, a vehicle actuated treadle in said lane and a keybox having a plurality of button switches for registering a plurality of different toll collection rates, the combination comprising, an electric stepping relay, an axial shaft, a classification printing wheel with printing indicia thereon comprising different indicium for each one of said button switches, said printing wheel being fixed on said axial shaft and adapted to be controlled by said stepping relay so as to successively move different indicium thereon into printing position, a rotary switch having a rotor fixed to said axial shaft and a stator cooperatively disposed with respect to said rotor, means to make a printed record of indicium on said classification printing wheel, electric circuit means, interconnecting said button switches, said stepping relay, said rotary switch, and said printing means, to move the indicium corresponding to the keybox button switch actuated into printing position, a forward counter relay, a reverse counter relay, each having count number wheels in printing position and each adapted to add a count for each time they are respectively energized by an electric pulse, and means interconnecting said vehicle actuated treadle and said forward and reverse counter relays to pulse said relays so as to count vehicles moving in said lane over said treadle in forward and reverse directions respectively, and means to print the count on said forward and reverse counter relay number wheels concurrently with the printing of said classification indicium.

5. In a transaction printer adapted for use in connection with a toll collection system including a plurality of highway lanes for vehicular transit, and keyboxes, one in each lane and each having a plurality of button switches for registering a plurality of different toll collection rates, the combination comprising, an electric stepping relay, an axial shaft, a classification printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said classification printing wheel, a lane number printing wheel in printing position alignment and adapted to be moved into a plurality of positions for printing a plurality of numbers, one each to correspond with the individual lane numbers of said plurality of lanes, a second shaft connected to said number printing wheel to manually move it into position to print a selected lane number, a second rotary switch having a rotor fixed to said second shaft and a stator cooperatively disposed with respect to said rotor, and electric circuit means, interconnecting all of said button switches in said plurality of lanes, said stepping switch, said second rotary switch and said printing means, to move the indicium on said classification printing wheel corresponding with the keybox button switch actuated in the particular lane number selected into printing position.

6. In a transaction printer adapted for use in connection with a toll collection system including a plurality of highway lanes for vehicular transit, and keyboxes, one in each lane and each having a plurality of button switches for registering a plurality of different toll collection rates, the combination comprising, an electric stepping relay, an axial shaft, a classification printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said classification printing wheel, a lane number printing wheel in printing position alignment and adapted to be moved into a plurality of positions for printing a plurality of numbers, one each to correspond with the individual lane numbers of said plurality of lanes, a second shaft connected to said number printing wheel to manually move it into position to print a selected lane number, a second rotary switch having a rotor fixed to said second shaft and a stator cooperatively disposed with respect to said rotor, and electric circuit means, interconnecting all of said button switches in said plurality of lanes, said stepping switch, said second rotary switch and said printing means, to move the indicium on said classification printing wheel corresponding with the keybox button switch actuated in the particular lane number selected into printing position, and immediately thereafter make a print.

7. In a transaction printer adapted for use in connection with a toll collection system including a plurality of highway lanes for vehicular transit and keyboxes, one in each lane and each having a plurality of button switches for registering a plurality of different toll collection rates, the combination comprising, an electric stepping relay, an axial shaft, a classification printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said classification printing wheel, a lane number printing wheel in printing position alignment and adapted to be moved into a plurality of positions for printing a plurality of numbers, one each to correspond with the individual lane numbers of said plurality of lanes, a second shaft connected to said number printing wheel to manually move it into position to print a selected lane number, a second rotary switch having a rotor fixed to said second shaft and a stator cooperatively disposed with respect to said rotor, electric circuit means, interconnecting all of said button switches in said plurality of lanes, said stepping switch, said second rotary switch and said printing means, to move the indicium on said classification printing wheel corresponding with the keybox button switch actuated in the particular lane number selected into printing position, a second relay, a printing slug with printing indicia thereon adapted to be brought into printing position by said second relay when energized, means in printing position to indicate the date and time to the nearest minute, means controlled by said time indicating means operative on the even hour to make a print and at the same time energize said second relay, so that hourly prints are characterized by the printed indicia of said printing slug.

8. In a transaction printer adapted for use in connection with a toll collection system including a plurality of highway lanes for vehicular transit, vehicle actuated treadles, one in each lane, and keyboxes, one in each lane and each having a plurality of button switches for registering a plurality of different toll collection rates, the combination comprising, an electric stepping relay, an axial shaft, a classification printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said classification printing wheel, a lane number printing wheel in printing position alignment and adapted to be moved into a plurality of positions for printing a plurality of numbers, one each to correspond with the individual lane numbers of said plurality of lanes, a second shaft connected to said number printing wheel to manually move it into position to print a selected lane number, a second rotary switch having a rotor fixed to said second shaft and a stator cooperatively disposed with respect to said rotor, electric circuit means, interconnecting all of said button switches in said plurality of lanes, said stepping switch, said second rotary switch and said printing means, to move the indicium on said classification printing wheel corresponding with the keybox button switch actuated in the particular lane number selected into printing position, a forward counter relay, a reverse counter relay, each having count number wheels in printing position and each adapted to add a count for each time they are respectively energized by an electric pulse, and means, controlled by said electric circuit means, interconnecting said vehicle actuated treadles and said forward and reverse counter relays to pulse said relays so as to count vehicles moving over the treadle in the particular lane selected in forward and reverse directions respectively.

9. In a transaction printer adapted for use in connection with a toll collection system including a plurality of highway lanes for vehicular transit, and keyboxes, one in each lane and each having a plurality of button switches for registering a plurality of different toll collection rates, the combination comprising, an electric stepping relay, an axial shaft, a printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said printing wheel, a second stepping relay, a lane number printing wheel in printing position alignment and adapted to be rotated by said second stepping relay so as to be moved into a plurality of positions for printing a plurality of numbers, a second shaft connected to said lane number printing wheel so as to be rotated therewith, a second rotary switch having a rotor fixed to said shaft and a stator cooperatively disposed with respect to said last rotor, a third rotary switch having its rotor fixed to said second shaft and its stator cooperatively disposed with respect to said rotor, a plurality of selector switches, one for each of said plurality of lanes, and electric circuit means, controlled by the actuation of one of said plurality of selector switches and interconnecting all of said button switches in said plurality of lanes, said stepping switch, said second and third rotary switches, said selector switches and said printing means to actuate said stepping relay so as to move the indicium on said classification printing wheel corresponding with the keybox button switch actuated in the particular lane number selected into printing position and at the same time to actuate said second stepping relay to move the particular lane number selected on said lane number printing wheel into printing position.

10. In a transaction printer adapted for use in connection with a toll collection system including a plurality of highway lanes for vehicular transit, and keyboxes, one in each lane and each having a plurality of button switches for registering a plurality of different toll collection rates, the combination comprising, an electric stepping relay, an axial shaft, a printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said printing wheel, a second stepping relay, a lane number printing wheel in printing position alignment and adapted to be rotated by said second stepping relay so as to be moved into a plurality of positions for printing a plurality of numbers, a second shaft connected to said lane number printing wheel so as to be rotated therewith, a second rotary switch having a rotor fixed to said shaft and a stator cooperatively disposed with respect to said last rotor, a third rotary switch having its rotor fixed to said second shaft and its stator cooperatively disposed with respect to said rotor, a plurality of selector switches, one for each of said plurality of lanes, and electric circuit means, controlled by the actuation of one of said plurality of selector switches and interconnecting all of said button switches in said plurality of lanes, said stepping switch, said second and third rotary switches, said selector switches and said printing means to actuate said stepping relay so as to move the indicium on said classification printing wheel corresponding with the keybox button switch actuated in the particular lane number selected into printing position and at the same time to actuate said second stepping relay to move the particular lane number selected on said lane number printing wheel into printing position and immediately thereafter make a print.

11. In a transaction printer adapted for use in connection with a toll collection system including a plurality of highway lanes for vehicular transit, vehicle actuated treadles one in each lane and keyboxes, one in each lane and each having a plurality of button switches for registering a plurality of different toll collection rates, the combination comprising, an electric stepping relay, an axial shaft, a printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said printing wheel, a second stepping relay, a lane number printing wheel in printing position alignment and adapted to be rotated by said second stepping relay so as to be moved into a plurality of positions for printing a plurality of numbers, a second shaft connected to said lane number printing wheel so as to be rotated therewith, a second rotary switch having a rotor fixed to said shaft and a stator cooperatively disposed with respect to said last rotor, a third rotary switch having its rotor fixed to said second shaft and its stator cooperatively disposed with respect to said rotor, a plurality of selector switches, one for each of said plurality of lanes, electric circuit means, controlled by the actuation of one of said plurality of selector switches and interconnecting all of said button switches in said plurality of lanes, said stepping switch, said second and third rotary switches, said selector switches and said printing means to actuate said stepping relay so as to move the indicium on said classification printing wheel corresponding with the keybox button switch actuated in the particular lane number selected into printing position and at the same time to actuate said second stepping relay to move the particular lane number selected on said lane number printing wheel into printing position, a second relay, a printing slug with printing indicia thereon adapted to be brought into printing position by said second relay when energized, means in printing position to indicate the date and time to the nearest minute, means controlled by said time indicating means operative on the even hour to make a print and at the same time energize said second relay, so that hourly prints are characterized by the printed indicia of said printing slug.

12. In a transaction printer adapted for use in connection with a toll collection system including a plurality of highway lanes for vehicular transit, vehicle actuated treadles one in each lane and keyboxes, one in each lane and each having a plurality of button switches for registering a plurality of different toll collection rates, the combination comprising, an electric stepping relay, an axial shaft, a printing wheel with printing indicia thereon comprising different indicium for each one of said plurality of button switches, said classification printing wheel being fixed on said axial shaft and adapted to be controlled by said stepping relay so as to successively move the different indicium thereon into printing position, a rotary stepping switch having its rotor fixed to said axial shaft and its stator cooperatively disposed with respect to said rotor, means to make a printed record of indicium on said printing wheel, a second stepping relay, a lane number printing wheel in printing position alignment and adapted to be rotated by said second stepping relay so as to be moved into a plurality of positions for printing a plurality of numbers, a second shaft connected to said lane number printing wheel so as to be rotated therewith, a second rotary switch having a rotor fixed to said shaft and a stator cooperatively disposed with respect to said last rotor, a third rotary switch having its rotor fixed to said second shaft and its stator cooperatively disposed with respect to said rotor, a plurality of selector switches, one for each of said plurality of lanes, electric circuit means, controlled by the actuation of one of said plurality of selector switches and interconnecting all of said button switches in said plurality of lanes, said stepping switch, said second and third rotary switches, said selector switches and said printing means to actuate said stepping relay so as to move the indicium on said classification printing wheel corresponding with the keybox button switch actuated in the particular lane number selected into printing position and at the same time to actuate said second stepping relay to move the particular lane number selected on said lane number printing wheel into printing position, a forward counter relay, a reverse counter relay, each having count number wheels in printing position and each adapted to add a count for each time they are respectively energized by an electric pulse, and means controlled by said electric circuit means, interconnecting said vehicle actuated treadles and said forward and reverse counter relays to pulse said relays so as to count vehicles moving over the treadle in the particular lane selected in forward and reverse directions respectively.

13. In a vehicle toll collection system, a switch treadle in a lane adapted to be traversed by a vehicle, a key register having classification keys corresponding to various toll rates for different types of vehicles, a counter, means to actuate the counter each time the wheels on an axle of a vehicle roll over the treadle, normally inoperative means to print the count automatically each time one of the classification keys is actuated, means to make the last means operative, a printing wheel having indicia thereon corresponding to the classification keys, means to move the printing wheel to selectively bring and index at a printing position indicium corresponding to the classification button which has been actuated, and means to print the indicium on said wheel corresponding to said classification automatically upon actuating said classification button.

14. In a vehicle toll collection system, a switch treadle in a lane adapted to be traversed by a vehicle, a key register having classification keys corresponding to various toll rates for different types of vehicles, a counter, means to actuate the counter each time the wheels on an axle of a vehicle roll over the treadle, normally inoperative means to print the count automatically each time one of the classification keys is actuated, means to make the last means operative, a printing wheel having indicia thereon corresponding to the classification keys, means to move the printing wheel to selectively bring and index at a printing position indicium corresponding to the classification button which has been actuated, means to print the indicium on said wheel corresponding to said classification automatically upon actuating said classification button, and means to print the month, day and hour each time the treadle count and classification indicium is printed.

15. In a vehicle toll collection system, a switch treadle in a lane adapted to be traversed by a vehicle, a key register having classification keys corresponding to various toll rates for different types of vehicles, a counter, means to actuate the counter each time the wheels on an axle of a vehicle roll over the treadle, normally inoperative means to print the count automatically each time one of the classification keys is actuated, means to make the last means operative, a printing wheel having indicia thereon corresponding to the classification keys, means to move the printing wheel to selectively bring and index at a printing position indicium corresponding to the classification button which has been actuated, means to print the indicium on said wheel corresponding to said classification automatically upon actuating said classification button, means to print the month, day and hour each time the treadle count and classification indicium is printed, and means to print the treadle count, the last classification indicium printed, and the month, day and hour at predetermined intervals of time.

16. In a vehicle toll collection system, a counter, a plurality of treadles each in a different lane, a circuit connected to the counter for actuating the counter each time the circuit is actuated, selector means for selectively connecting said circuit to one of said treadles, whereby when the wheels on an axle of a vehicle roll over the selected treadle, said circuit will be actuated to operate the counter, a key box for each treadle, a plurality of classification switches in each key box corresponding to different toll rates for different vehicles traversing the lanes, a printing wheel having indicia thereon corresponding to the classification switches of each key box, a selector switch having switches thereon corresponding to the classification switches in each key box, means on said selector means to connect the switches of one of said key boxes with said selector switch, means to actuate said selector switch to a point corresponding to a switch actuated in the selected key box, and means controlled by the position of the selector switch upon actuating one of the switches in the selected key box to bring the printing wheel to a predetermined position.

17. In a vehicle toll collection system, a counter, a plurality of treadles each in a different lane, a circuit connected to the counter for actuating the counter each time the circuit is actuated, selector means for selectively connecting said circuit to one of said treadles, whereby when the wheels on an axle of a vehicle roll over the selected treadle, said circuit will be actuated to operate the counter, a key box for each treadle, a plurality of classification switches in each key box corresponding to different toll rates for different vehicles traversing the lanes, a printing wheel having indicia thereon corresponding to the classification switches of each key box, a selector switch having switches thereon corresponding to the classification switches in each key box, means on said selector means to connect the switches of one of said key boxes with said selector switch, means to actuate said selector switch to a point corresponding to a switch actuated in the selected key box, means controlled by the position of the selector switch upon actuating one of the switches in the selected key box to bring the printing wheel to a predetermined position, and means to print the treadle count and the indicium in printing position on the classification wheel upon actuating said classification switch.

18. In a vehicle toll collection system, a counter, a plurality of treadles each in a different lane, a circuit connected to the counter for actuating the counter each time the circuit is actuated, selector means for selectively connecting said circuit to one of said treadles, whereby when the wheels on an axle of a vehicle roll over the selected treadle, said circuit will be actuated to operate the counter, a key box for each treadle, a plurality of classification switches in each key box corresponding to different toll rates for different vehicles traversing the lanes, a printing wheel having indicia thereon corresponding to the classification switches of each key box, a selector switch having switches thereon corresponding to the classification switches in each key box, means on said selector means to connect the switches of one of said key boxes with said selector switch, means to actuate said selector switch to a point corresponding to a switch actuated in the selected key box, means controlled by the position of the selector switch upon actuating one of the switches in the selected key box to bring the printing wheel to a predetermined position, means to print the treadle count and the indicium in printing position on the classification wheel upon actuating said classification switch, and means to print the treadle count and the classification at predetermined intervals of time.

19. In a toll collection system, a plurality of treadles in different lanes adapted to be traversed by vehicles passing through the various lanes, a key box in each lane, a plurality of classification switches in each key box, a vehicle counter, means to actuate the counter, selector means to connect one of said treadles to the counter actuating means, a stepping switch, means actuated by the selector means to connect the stepping switch in circuit with the classification switches of the key box associated with the selected treadle, means to indicate the selected treadle and key box, means controlled by actuating one of the classification switches in the selected key box to bring the stepping switch to a position corresponding to the classification switch actuated, and means controlled by the stepping switch to indicate the particular classification switch actuated.

20. In a toll collection system, a plurality of treadles in different lanes adapted to be traversed by vehicles passing through the various lanes, a key box in each lane, a plurality of classification switches in each key box, a vehicle counter, means to actuate the counter, selector means to connect one of said treadles to the counter actuating means, a stepping switch, means actuated by the selector means to connect the stepping switch in circuit with the classification switches of the key box associated with the selected treadle, means to indicate the selected treadle and key box, means controlled by actuating one of the classification switches in the selected key box to bring the stepping switch to a position corresponding to the classification switch actuated, means controlled by the stepping switch to indicate the particular classification switch actuated, and means controlled by the actuating of one of said classification switches to print against said counter and the means for indicating the treadle and key box selected and the means for indicating the last classification switch actuated, and remote controlled means for actuating the means for selecting the treadle and key box.

21. In a vehicle toll collection system, a plurality of lanes, a keybox associated with each lane and having plural key buttons, each of said key buttons actuable for registering a plurality of different toll collection rates, a transaction printer including classification means having indicia thereon corresponding to the different toll collection rates, a circuit connected to the transaction printer for actuating the printer each time the circuit is actuated, selector means for selectively connecting said circuit to one of said key boxes whereby said circuit will be actuated to actuate the printer to print the toll rate indicium corresponding to the key button that is actuated each time one of said key buttons is actuated.

22. In a vehicle toll collection system, including a plurality of highway lanes for vehicular transit, and each of said lanes having a treadle, counters and a keybox associated therewith, said keybox having a plurality of key buttons actuable for registering a plurality of different toll collection rates, the combination comprising, normally inoperative circuit means selectively associated with each treadle, counters and keybox, remote counting means, remote toll rate classification means, means to make said normally inoperative circuit means operative, and means to print the count of said counting means concurrently with the classification of said classification means upon the actuation of a key button.

23. In a vehicle toll collection system, a counter, a plurality of treadles each in a different lane, a circuit connected to the counter for actuating the counter each time the circuit is actuated, and selector means for selectively connecting said circuit to one of said treadles, whereby said circuit will be actuated to operate the counter when the wheels on an axle of a vehicle roll over the selected treadle, and means to prevent actuation of said counter by any treadle other than the selected treadle.

24. In a vehicle toll collection system, a counter, a plurality of treadles each in a different lane, a circuit connected to the counter for actuating the counter each time the circuit is actuated, a keybox for each treadle, a plurality of classification key buttons in each keybox corresponding to different toll rates for different vehicles traversing the lane, classification printing means having indicia thereon corresponding to the different toll rates, a second circuit connected to said classification printing means for actuating said classification printing means each time said second circuit is actuated, selector means for selectively connecting said first and second circuits respectively to a treadle and associated keybox, whereby said first circuit is actuated each time the selected treadle is actuated and said second circuit is actuated each time a key button is actuated, to print the count on said counter and print the toll rate of the actuated key button.

25. In a vehicle toll collection system, a switch treadle in a lane adapted to be traversed by a vehicle, a key register having classification keys corresponding to various toll rates for different types of vehicles, a counter, means to actuate the counter each time the wheels on an axle of a vehicle roll over the treadle, and normally inoperative means to print the count automatically each time one of the classification keys is actuated, and means to make the last means inoperative.

26. In a vehicle toll collection system, a switch treadle in a lane adapted to be traversed by a vehicle, a key register having classification keys corresponding to various toll rates for different types of vehicles, a counter, means to actuate the counter each time the wheels on an axle of a vehicle roll over the treadle, and normally inoperative means to print the count automatically each time one of the classification keys is actuated, and means to make the last means inoperative, and means to print the count automatically at predetermined intervals.

BENJAMIN COOPER.

REFERENCES CITED

The following references are of record in the file of this patent:

UNITED STATES PATENTS

| Number | Name | Date |
|---|---|---|
| 1,513,811 | Heinold | Nov. 4, 1924 |
| 1,835,234 | McKeen | Dec. 8, 1931 |
| 1,872,782 | Messick et al. | Aug. 23, 1932 |
| 2,311,359 | Barker | Feb. 16, 1943 |
| 2,313,627 | Cooper | Mar. 9, 1943 |
| 2,330,872 | Diebold | Oct. 5, 1943 |
| 2,351,405 | Cooper | June 13, 1944 |